UNITED STATES PATENT OFFICE.

LOUIS R. BROADBENT AND CHARLES F. BROADBENT, OF BALTIMORE, MD.

IMPROVEMENT IN PROCESSES FOR SEPARATING WOOLEN FROM COTTON FIBER.

Specification forming part of Letters Patent No. 173,762, dated February 22, 1876; application filed February 8, 1876.

*To all whom it may concern:*

Be it known that we, LOUIS R. BROADBENT and CHARLES F. BROADBENT, of Baltimore, Maryland, have invented a new and improved process for separating woolen fiber from rags or other materials containing a mixture of wool and cotton, of which the following is a specification:

This invention relates to that class of processes employed for separating woolen fiber from rags or other material composed of a mixture of wool and cotton, and consists in subjecting such material to the action of boiling hydrochloric acid and water, in such proportions and under such circumstances as are hereinafter described.

In carrying out our invention, take the rags or other material to be operated upon, put them in cold water, and allow them to remain for about the space of one hour before placing them in the acid-bath, to be prepared as follows: Take of hydrochloric acid, by bulk, one part, and of water, by bulk, five parts; mix them together and put the mixture over a fire to boil; when the acid-bath thus prepared is boiling, take the woolen and cotton material from the cold-water bath, place them in the boiling acid bath, which is to be kept boiling during the whole time, and allow them to remain from six to twenty minutes. By this operation the cotton fiber will be entirely destroyed and removed. When this part of the process is completed, remove the woolen fiber from the boiling-acid bath and place it in a cold water bath, and allow it to remain for twelve hours. At the end of the twelve hours, the now prepared wool fiber may be removed from the bath and dried, when it is fit for any use or manufacture to which wool fiber is applicable.

We are aware that it is a well-known chemical fact that hydrochloric and many other acids, vegetable and mineral, will more readily dissolve and decompose vegetable than animal fibers; and we do not mean to claim such use of hydrochloric acid, broadly.

We claim as our invention—

The within-described process of separating wool from cotton fiber, which process consists in steeping the fabric in water, then boiling it in hydrochloric-acid solution of a specific gravity of from 1.015 to 1.19 for from three to twenty-five minutes, and withdrawing, substantially as described.

LOUIS R. BROADBENT.
CHAS. F. BROADBENT.

Witnesses:
GEORGE B. STONE,
HOBART HUTTON.